(12) United States Patent
Amedeo et al.

(10) Patent No.: US 7,993,603 B2
(45) Date of Patent: Aug. 9, 2011

(54) TUNNEL FOR CONDITIONING OF PRODUCTS, ESPECIALLY FOR STERILIZATION OF FOOD IN PREPACKAGED CONTAINERS

(76) Inventors: Pagotto Amedeo, Brescia (IT); Renato Giordano, Newport Beach, CA (US)

( * ) Notice: Subject to any disclaimer, the term of this patent is extended or adjusted under 35 U.S.C. 154(b) by 879 days.

(21) Appl. No.: 10/684,314

(22) Filed: Oct. 13, 2003

(65) Prior Publication Data

US 2004/0131519 A1  Jul. 8, 2004

(51) Int. Cl.
*C11B 1/04* (2006.01)
*A61L 2/00* (2006.01)
*A23C 3/07* (2006.01)
*A23C 3/02* (2006.01)

(52) U.S. Cl. ............... 422/308; 422/21; 99/451; 99/483

(58) Field of Classification Search .................... 99/451, 99/477, 417, 483; 422/304, 308; 426/241
See application file for complete search history.

(56) References Cited

U.S. PATENT DOCUMENTS

| | | | | |
|---|---|---|---|---|
| 3,402,277 | A | * | 9/1968 | Muller .......................... 219/700 |
| 3,718,082 | A | * | 2/1973 | Lipoma .......................... 99/470 |
| 3,747,296 | A | | 7/1973 | Zausner .......................... 53/167 |
| 3,889,009 | A | | 6/1975 | Lipoma .......................... 426/234 |
| 3,961,569 | A | * | 6/1976 | Kenyon et al. ................... 99/451 |
| 4,342,726 | A | * | 8/1982 | Savi ............................. 422/302 |
| 4,687,895 | A | * | 8/1987 | Chitre et al. ................... 219/701 |
| 4,809,596 | A | * | 3/1989 | Akutsu et al. ................... 99/472 |
| 5,066,503 | A | | 11/1991 | Ruozi .......................... 426/234 |
| 5,074,200 | A | * | 12/1991 | Ruozi .......................... 99/451 |
| 5,750,966 | A | | 5/1998 | Ruozi .......................... 219/692 |
| 5,919,506 | A | | 7/1999 | Ruozzi ......................... 426/241 |
| 6,039,991 | A | | 3/2000 | Ruozi .......................... 426/241 |
| 6,073,540 | A | * | 6/2000 | Garrett .......................... 99/330 |
| 6,342,187 | B1 | * | 1/2002 | Jacob et al. .................. 422/186.05 |
| 6,803,066 | B2 | * | 10/2004 | Traeder et al. ................. 426/333 |
| 2002/0017033 | A1 | * | 2/2002 | Wefers .......................... 34/263 |
| 2003/0209542 | A1 | * | 11/2003 | Harris .......................... 219/696 |

FOREIGN PATENT DOCUMENTS

| | | |
|---|---|---|
| GB | 1103597 | 2/1968 |
| WO | WO0102023 | 1/2001 |

* cited by examiner

*Primary Examiner* — Kevin Joyner
(74) *Attorney, Agent, or Firm* — David G. Duckworth; Russo & Duckworth, LLP

(57) ABSTRACT

Tunnel is provided for conditioning of food products, especially for sterilization of food in containers or vessels of the heat-sealed type, in which the conditioning unit has: 1) an active pressure control system corresponding to at least one heating stage, which provides for balancing of the pressure within the heat-sealed vessels or containers; and 2) a conveyor which conveys the heat-sealed vessels or containers through the stages along the conditioning unit which contains mechanisms that move the conveyor outside of the conditioning tunnel, and 3) doors operating like check valves that separate the stages of the conditioning unit; and 4) a cross section of the tunnel of the polygonal type; and 5) the conditioning unit including inlets for introduction of washing liquids with a corresponding discharge outlet. Preferably, the magnetrons are covered to protect each magnetron from liquids. In preferred embodiments, the conditioning tunnel includes temperature sensors for measuring the temperature of products within the tunnel. Moreover, preferably the conveyor is adjustable to move forward and rearward, and the magnetrons are adjustable to provide a controllably moveable magnetic field. A controller is connected to the temperature sensors, conveyor and magnetrons to cause the conveyor to move products forward or rearward, or cause the magnetrons to move the magnetic field relative to the food products to more thoroughly and evenly cook the food products.

9 Claims, 9 Drawing Sheets

TUNNEL FOR CONDITIONING OF PRODUCTS, ESPECIALLY FOR STERILIZATION OF FOOD IN PREPACKAGED CONTAINERS

RELATED APPLICATIONS

This application is a continuation-in-part of the co-pending Italian Application Serial Number TV 2002 A000120, filed Oct. 18, 2002.

BACKGROUND OF THE INVENTION

The present invention relates to methods and apparatus for sanitizing items. More particularly, the invention relates to improved microwave cooking systems having a plurality of linearly aligned segments for processing food products.

The invention finds special, but not exclusive application in the sector of collective catering, where sterilization treatment of foods already sealed in containers not to be consumed immediately is required. A second possible application can also concern sterilization or sanitization of other products intended for the food chain, like flour, rice, as well as specific products of various nature, prepared or not, and medicinal products or parts of them. Still a third application of the present invention concerns the sterilization of medical equipment.

Techniques for conditioning foods for serving of meals to a large number of persons, for example, are certainly known, as occurs in dining halls, in hospitals and other facilities, where large numbers of persons make traditional catering untenable, at least in terms of cost. On the practical side, these techniques can be summarized in three basic steps: a) selection and precooking of foods; b) preservation; and c) serving.

Conventionally, a cycle of selection and precooking of foods is followed by a preservation cycle, which typically includes the use of refrigerators or freezers and, in more recent techniques, rapid heating vessels.

In some cases, where preservation on an industrial scale is required, a post-preparation sterilization phase is required between the first and second stages, which, as in the case of use of a container alone, is not limited to attenuation of microbial, pathogenic and enzymatic activity, but has the purpose of destroying all microorganisms present in the product, and also in the actual container/package. This occurs, because the degree of resistance to heat of microorganisms is related to external and environmental factors, like the initial microbial concentration of the medium, the characteristics of the medium itself and the time and temperature parameters, as well as intrinsic factors related to heat sensitivity of germs, development stage of the cells, in which specific variations often occur. For example, under identical environmental conditions, it is observed that fungi and yeast are more resistant than coli bacteria and, within the latter, the rod forms are more resistant that the coccal forms.

Under practical conditions, to carry out sterilization, it is necessary to heat the product to a temperature between 65° C. and 121° C. for a time of between 5 and 12 minutes. Subsequently, the product must be subjected to the most rapid possible cooling to a temperature equal to or less than 35°.

The use of high frequency electromagnetic waves, better known as microwaves, is known for performing the sterilization stage. In this sense, GB1103597 (Newton et al.) already suggested a system for controlling microorganisms contains in prepared foods and beverages. It prescribes for exposure of the already prepared foods with the package to electromagnetic waves with a frequency of 20-40 MHz at an intensity of 500-3000 volts for a sufficient period of time to attenuate the microorganisms present in the manufactured product. The use of a magnetron to sterilize materials is known in even greater detail. For example, WO0102023 (Korchagin) proposes a magnetron that has the capacity to implement the intensity of the magnetic field at a level to ensure destruction of microorganisms.

Complex apparatuses, specifically continuous treatment tunnels for sanitization of packaged products, have been known since 1973. U.S. Pat. No. 3,747,296 (Zausner) proposes an apparatus with linear development, in which filled containers are introduced and subsequently closed. Said containers are passed through the tunnel, which is subdivided into different treatment zones at temperatures between 90° C. and 150° C. Means of irradiation are also provided, which have the purpose of sterilizing the cover only.

U.S. Pat. Nos. 5,066,503; 5,074,200; 5,919,506 and 6,039,991 issued to Ruozi describe conveyor driven microwave processing plants for pasteurizing, cooking and sterilizing food products. The plants include a plurality of chambers wherein the temperature and pressure are controllable elevated and decreased within as the food products travel from chamber to chamber.

U.S. Pat. No. 3,889,009 (Lipoma) describes a conditioning tunnel for foods previously prepared in bowls and sealed under pressure. The conditioning tunnel essentially consists of an external covering, along which a conveyor belt moves. At the entry and exit of this tunnel, corresponding to the crossing point of the manufactured vessels, pressure closure doors are provided. Once the sealed vessels have entered the interior of the tunnel, each vessel undergoes a sterilization treatment, passing beneath a source of electromagnetic waves. Each vessel is then transferred downline, always by means of a common belt or chain conveyor, to pass through a cooling unit. A device to generate pressure during the sterilization phase operates within the apparatus to avoid a situation in which the products, because of the process, burst because of the dilation effect, or whose sealing strength is altered. This phenomenon most frequently entails escape of liquid from individual containers, producing not insignificant drawbacks within the apparatus, like accumulation of dirt and the subsequent need to carry out frequent maintenance.

Other apparatuses based on developments of the system just described are also known. For example, in the catalogs of the Italian companies Modo Group International from Brescia Italy and Micromac from Reggio Emilia, automatic and computerized tunnels are described, which provide for receiving the products, in this case prepared dishes in a heat-sealed vessel, and are designed to carry out the fundamental phases of sterilization treatment. The tunnels include elongate cylindrical constructions have diametrically round cross sections, within which, corresponding to the different stages, the following process phases are conducted: 1) preheating; 2) reaching the sterilization temperature by means of induction devices that generate microwaves; 3) holding or stabilization of the product at the sterilization temperature for a specified time (magnetrons, which are positioned along the lower side of the conditioning tunnel beneath or corresponding to the plane of advance of the prepared foods, are typically provided to execute at least these last two phases); and 4) cooling before unloading. At the end of the process, a finished product emerges, completely sanitized and ready to be packaged and stored in warehouses.

Unfortunately, the prior art food processing systems suffer from numerous disadvantages. In particular, the previous solutions provide for the necessary magnetrons for gradual reaching and maintenance of the temperature within each product. These devices are situated indifferently along the overlying or underlying side of the line of advance of the heat-sealed bowls/trays/vessels. The cross section of the known conditioning tunnel is round, so that this circumstance actually limits the number of magnetrons that can be located along the axes perpendicular to the direction of advance of the vessels. Consequently, this shortcoming gives rise to two significant defects, in the first place excessive dimensioning (especially in length) of the treatment apparatus, and, when one intends to keep the dimensioning equal to the treated amounts, requiring additional microwave cooling devices, which are particularly expensive, and also difficult to operate and maintain.

Invariably in the known solutions, owing to the fact that the cross section of the conditioning tunnel is round, the means of longitudinal transport with respect to the tunnel, in the present case a belt or chain, is always contained within the tunnel. This second circumstance actually limits the space available within the tunnel, ultimately reducing the necessary area for treatment of the material. In addition, the presence of a conveyor device almost completely within the tunnel, with all the electromechanical mechanisms necessary for its functioning, offers an infinite number of surfaces and receptacles that are difficult to reach, within which dirt tends to progressively accumulate. The problem is a recurrent one, because the products being treated are, for the most part, food products with frequent presence of liquid, which can also be accidentally dispersed within the tunnel. These events require the use of frequent maintenance, in order to keep the qualitative aspect of treatment high.

Further problems are associated with the characteristics of the non-return valves that divide each of the stages present along the tunnels of the traditional type. These valves are of the mechanical opening and closing type, whereas the movement that they execute is essentially along a linear axis, using fittings situated peripherally to the closure plate. The negative aspect of these solutions concerns the fact that they are fairly complex and require accurate and constant maintenance to ensure, between the different treatment stages, maintenance of the pressure present in the concerned section.

Finally, it can happen that during sterilization treatments, in this case, heat-sealed vessels, some of them can burst, dispersing the liquid into the surrounding area. At present, on occurrence of the event, it is necessary to ensure the correct treatment, stop the installation and carry out thorough cleaning with removal of the leaked material.

SUMMARY OF THE INVENTION

These and other purposes are accomplished with the present innovation by providing a conditioning tunnel for food products, especially for sterilization of food in trays or bowls of the heat-sealed type, including a conditioning unit of the food products, consisting of a tunnel, in which a controlled pressure prevails, subdivided into stages, each stage corresponding to a phase of the treatment cycle that includes at least one heating phase and a cooling phase; a conveyor of the food products from upline to downline through the conditioning unit; openable and closeable doors arranged along the conditioning unit that separate each stage from the adjacent stage; and means of heating at least one stage of the conditioning unit containing a series of magnetrons. The conditioning unit has an active pressure control system corresponding to at least one heating stage, in which pressure equalization within the heat-sealed trays or bowls is prescribed; a conveyor level, which, through the stages, conveys the heat-sealed trays or bowls along the conditioning unit, which contains mechanisms that can be moved in the plane of the conveyor, positioned outside of the conditioning tunnel; check valves that separate the stages of the conditioning unit; and a cross section of the tunnel of the polygonal type; and corresponding to at least one stage of the conditioning unit, a washing liquid input header with corresponding unloading; as well as devices for protection from liquids of each magnetron.

In this manner, through substantial creative effort, whose effect represents immediate technical progress, some advantages are obtained.

A first purpose is that of optimizing the conditioning cycle of the food products, which comprises the phases of sterilization. This objective is essentially made possible by the presence of distinct and consecutive phases conducted in the respective stages of a conditioning unit, specifically preheating, heating and stabilization (or holding at a temperature for a certain period of time), each phase prescribing a controlled pressure within the respective stage that balances the pressure relative to the interior of the individual product.

A second purpose is to make more functional, but also simplify in purely structural terms, the operation of the non-return valves that separate each stage and, at the same time, have them participate actively in controlling the pressure within the different stages of the conditioning unit.

A third purpose consists, at equal dimensions, of obtaining greater available space within the tunnel by the effect of a quadrilateral cross section. On the practical side, this is conveyed by greater width of the tunnel, so as to increase at least the number of available magnetrons at right angles to the axis of advance of the products being treated. This circumstance therefore permits the treatment of a larger number of products with equal dimensions than with an apparatus of the traditional type.

A fourth purpose concerns the fact that the absence within the tunnel of movement mechanisms of the advance surface of the food products makes the conditioning unit more reliable in terms of the profile of components, significantly reducing maintenance, which can be conducted outside of the unit, thus reducing the downtimes of the machine, and also in terms of the profile of improved functionality. This circumstance significantly increases the useful treatment capacity of the conditioning tunnel, and also has the purpose of reducing formation of receptacles and spaces, where dirt can accumulate, and the development of bacterial colonies that are difficult to remove because of their location.

A fifth purposes consists of facilitating maintenance operations within the conditioning tunnel, when dispersion of liquids from the prepared foods occurs. In this case, it is observed that it is not necessary to stop the installation, because the magnetrons are covered by a protective sheath, remaining in a protective and effective condition, even in a case in which the vessels burst. In a subsequent phase at the end of the treatment cycle, more convenient cleaning is permitted, introducing directly into each stage a washing liquid that can then be eliminated through the corresponding discharge.

These and other advantageous or purposes will be apparent from the subsequent detailed description of some preferred solutions of the implementation by means of the appended schematic drawings, whose details are not intended to limit the invention, but merely exemplify it.

DETAILED DESCRIPTION OF THE INVENTION

With reference to the figures, a conditioning tunnel A is provided for the sterilization and sanitation or various products including medical equipment, food products and other items. Because the conditioning tunnel A is believed to have particular application for the sterilization, sanitization and cooking of foods already packaged in heat-sealed plates, bowls or trays 1, the conditioning tunnel of the present invention is described with particular application to the processing of food products. However, the conditioning tunnel is not limited thereto, and may be used to process innumerable other items.

Figure 13:
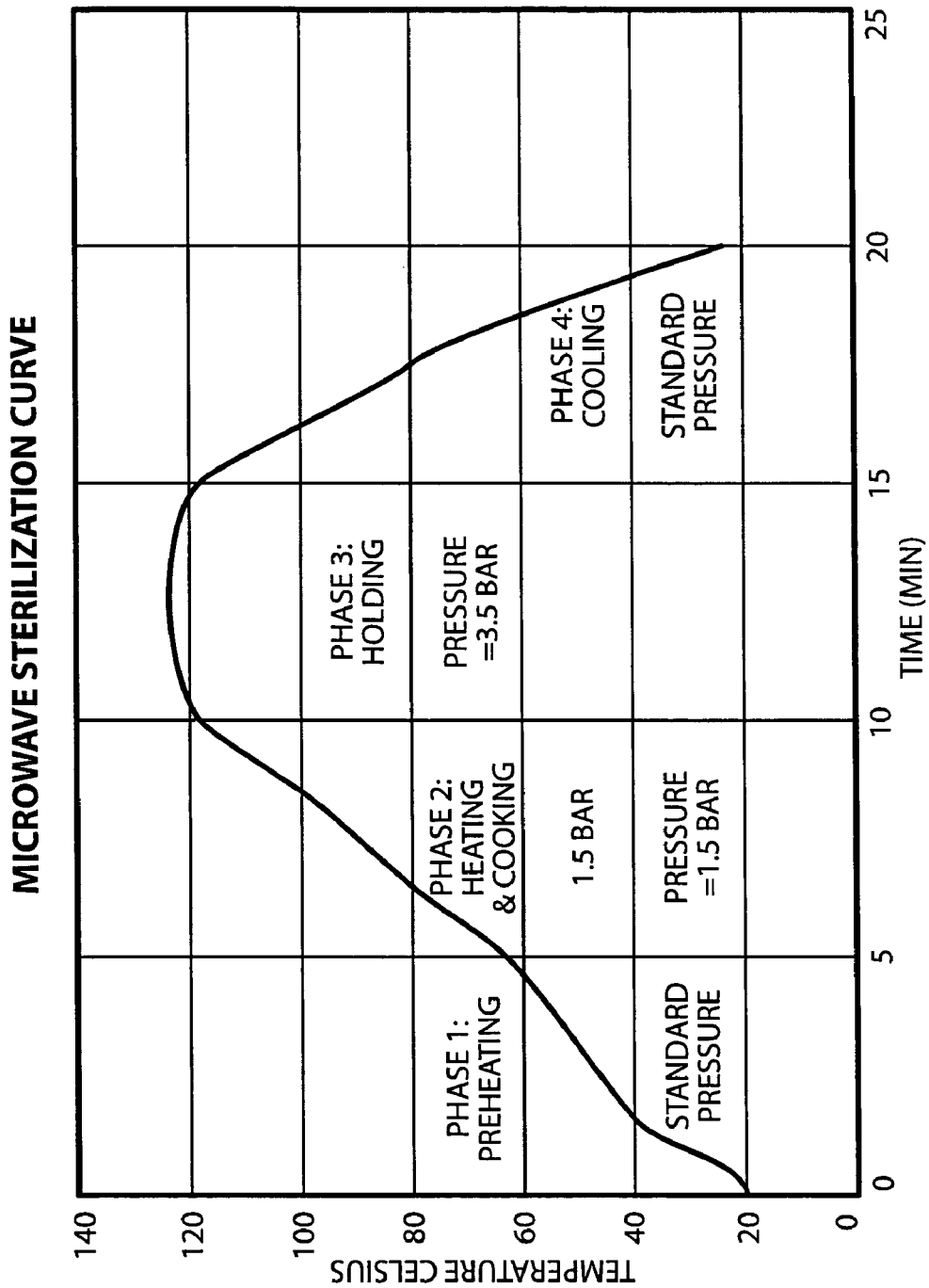
FIG. 13 is a graph illustrating the cooking parameters of temperature, pressure and time provided by a preferred food processing system of the present invention.

The conditioning tunnel A includes a parallelepipedal unit providing essentially linear development, through which the prepackaged products 1 transit longitudinally. The conditioning tunnel A is constructed by joining the head of one stage to the next one of the other four stages as preassembled modules, respectively, A1, A2, A3 and A4. Each of the four stages A1, A2, A3 and A4 represents a section of the conditioning tunnel A, within which one phase of the conditioning cycle is reproduced. With reference to FIG. 13, these stages include: A1) preheating; A2) heating and cooking; A3) holding; and A4) cooling. Along stage A1, the food, already packaged in plates, bowls or trays and heat-sealed, is subjected to a first preheating phase that brings the dishes from an ambient temperature close to 20° C. to 50° C. Along the second stage A2, the packaged dishes coming from the upline phase are then brought from a temperature of about 50° C. to a temperature of about 120° C., to then enter a downline phase A3, along which the packaged dishes are held or stabilized for a specified period of time at a temperature no lower than 120° C. At the end of these three phases A1, A2 and A3, the packaged dishes are finally transferred downline along stage A4, within which a cooling phase is carried out.

Each stage A1, A2, A3 and A4 of tunnel A is characterized by a typical section that has a rectangular shape on the transverse level with respect to the direction of advance of the packaged dishes 1 and coaxially has an interior chamber 11, also rectangular in shape, that extends in width between the two inside walls of the main chamber and has a longitudinal development at least equal to that of the corresponding stage A1, A2, A3.

Figure 12:
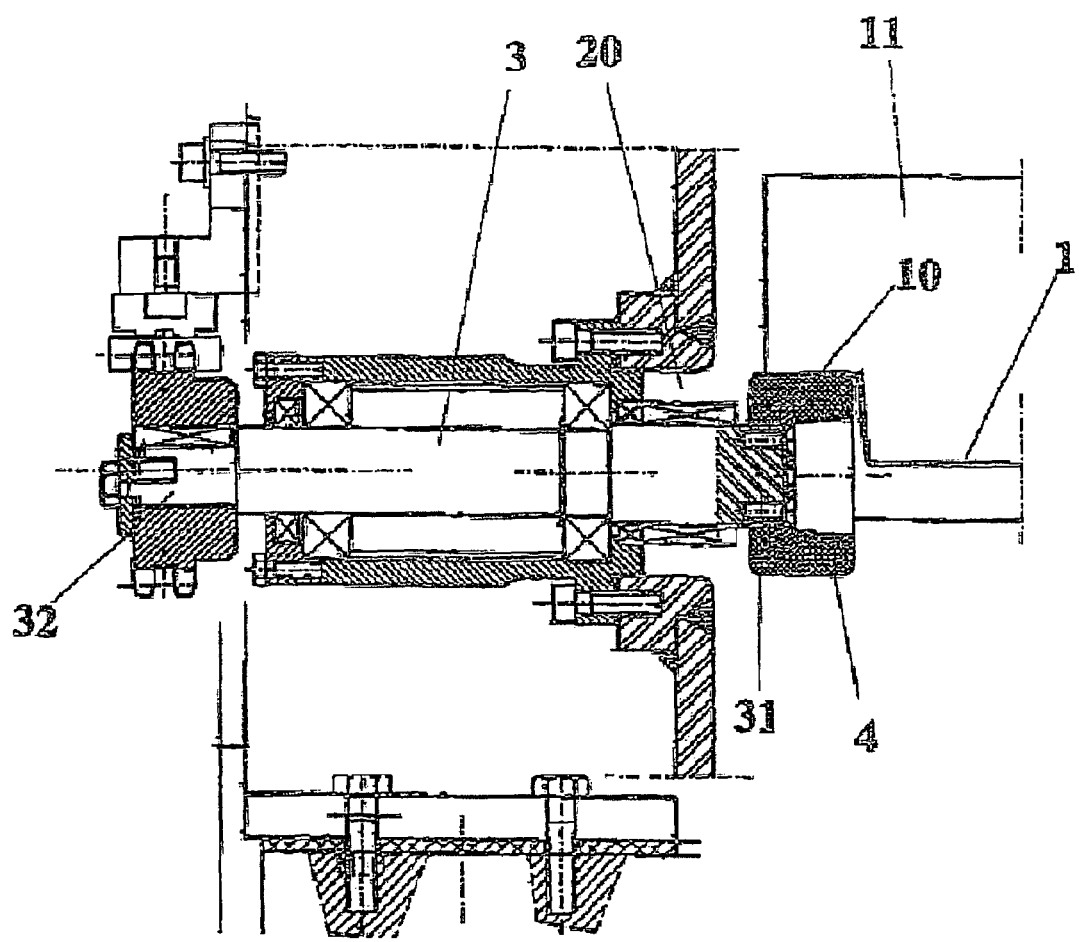
FIG. 12 is a cross sectional view of the conveyor of the heat-sealed vessels.

As shown in FIG. 12, in a preferred embodiment of the invention, the means for conveying the products through the conditioning tunnel is located outside of the tunnel. To this end, along the flanks 2 of the linear structure of each stage A1, A2, A3 and A4, apertures 20 are provided. The apertures 20 are longitudinally aligned and equidistantly positioned through the sidewalls of the chamber 11. A support shafts 3 projects through the apertures from the outside of the conditioning tunnel, entering the inside 31 of the chambers 11 of stages A1, A2, A3 and A4. At the corresponding end 31 inside the chamber 11 of stage A1, A2, A3 and A4, a wheel 4 is mounted, which has the purpose of keeping the packaged dishes 1 in movement. As shown in FIG. 12, the wheels support and propel the food products 1, a shown bowls, which have, at least on the side, a protruding lip 10 that is supported on the wheel 4. Rotation of one or more of the wheels 4 along the left and right sides of stage A1, A2, A3 and A4 is caused one or more motors and chains drives. These means of transmission and rotary motion are positioned on the outside along each flank of the stages A1, A2, A3 and A4, engaging the end of shaft 3, which has on the opposite end a corresponding toothed wheel 32. In this manner, by interaction of wheels 4, an idler is obtained that moves longitudinally, from upline to downline, the packaged dishes 1 through each stage A1, A2, A3 and A4, in a logical sequence controlled by a logic control unit. Preferably, the conveyor can move the food products forward or rearward through the conditioning tunnel. Moreover, preferably the conveyor provides an oscillating movement of the food products forwardly, or forwardly and rearwardly, to alter the magnetic field seen by the packages to provide more uniform heating. For example, the conveyor may move food products forwardly, followed by periodic pauses, to provide uniform heating. Alternatively, the conveyor may move the products forwardly and rearwardly in an oscillating manner to provide uniform heating.

Advantageously, by providing the motors and chain, or other drive mechanism, exterior to the chamber, the conveyor provides a minimum of surfaces within the chambers which are capable of collecting dirt or accidentally spilled food products. Moreover, though the drive mechanism of the present invention may include a shaft which projects across the interior of the chambers 11, preferably, and as shown in FIG. 12, the drive mechanism includes wheels which project only a few inches into each side of the chamber for supporting and propelling the food products 1. A traditional conveyor belt assembly with its corresponding rollers and belts are excluded, there eliminating additional surfaces which a capable of collecting dirt and accidentally spilled food products.

As reflected in FIG. 13, each stage A1, A2, A3 and A4 is also provided with a control system for controlling the internal pressure in the chamber for balancing the corresponding pressure present within the individual packaged dishes 1. It is known that during temperature treatments, the containers have a tendency to dilate to formation of steam. The presence of a controlled pressure within each of the stages A1, A2, A3 and A4 has the purpose of avoiding bursting of the containers and dispersal of the liquids inside of the conditioning tunnel.

Figure 1:
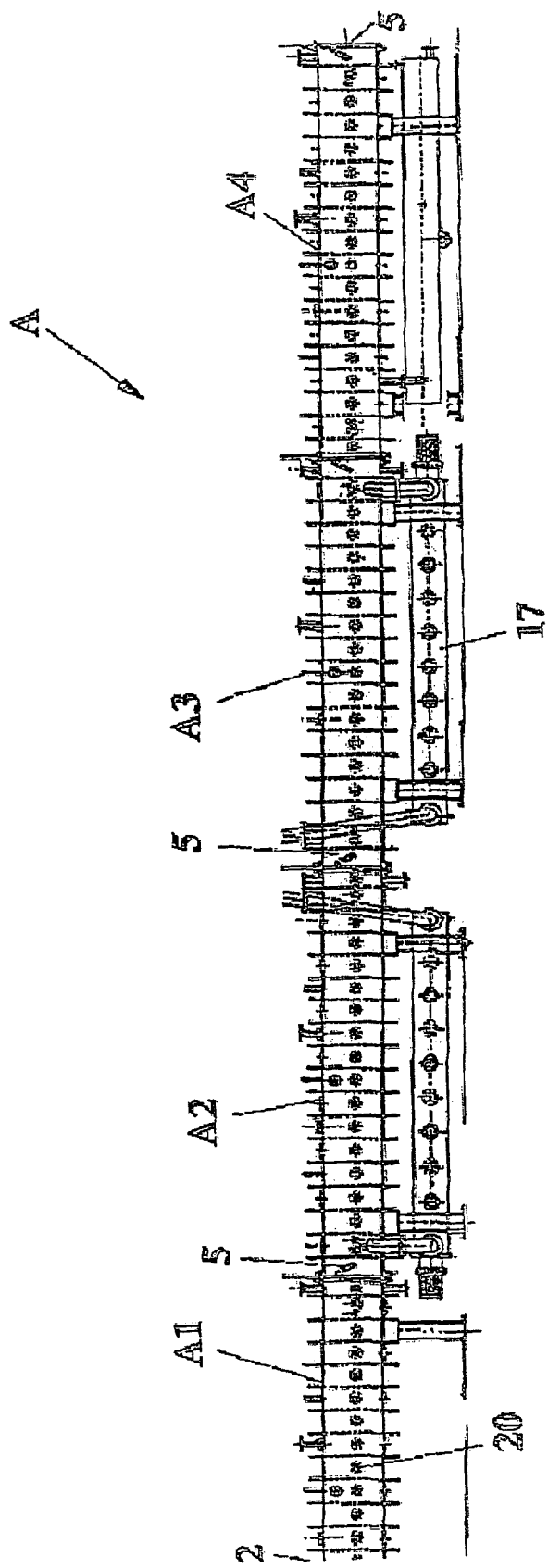
FIG. 1 is a side view of the conditioning unit, especially for food products, that provides four distinct stages, connected in succession.
Figure 2:
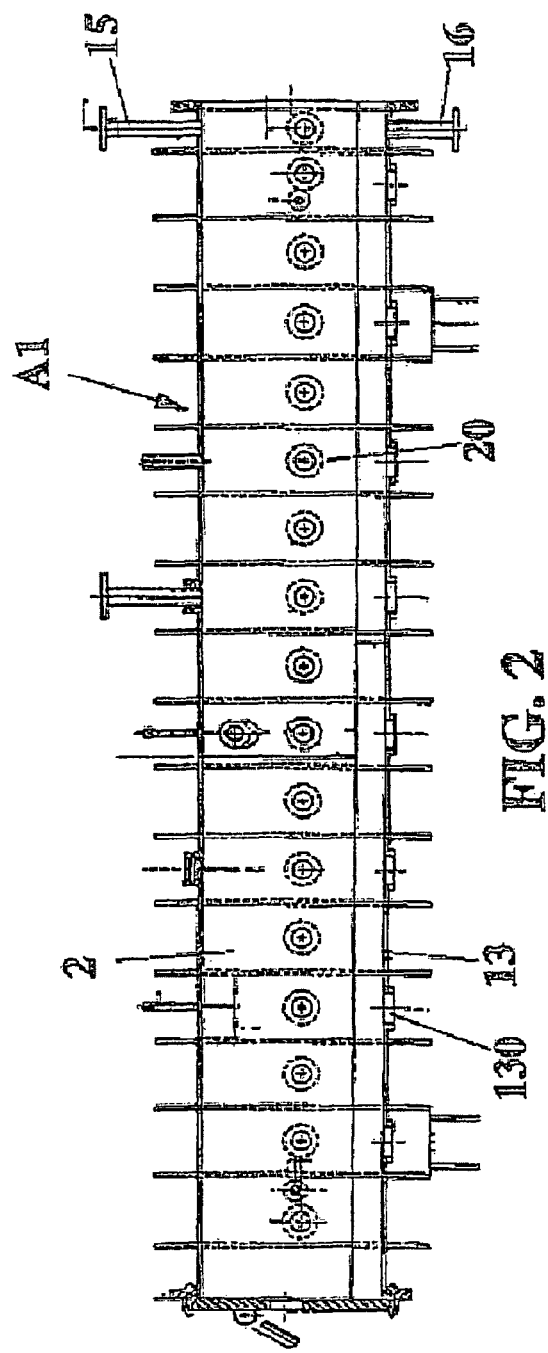
FIG. 2 is a side view of the first preheating stage, provided along the conditioning unit according to FIG. 1.
Figure 3:
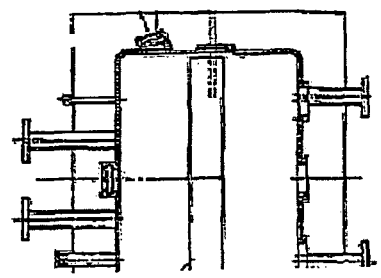
FIG. 3 is a cross sectional view of the first stage of the conditioning tunnel according to FIG. 2.
Figure 4:
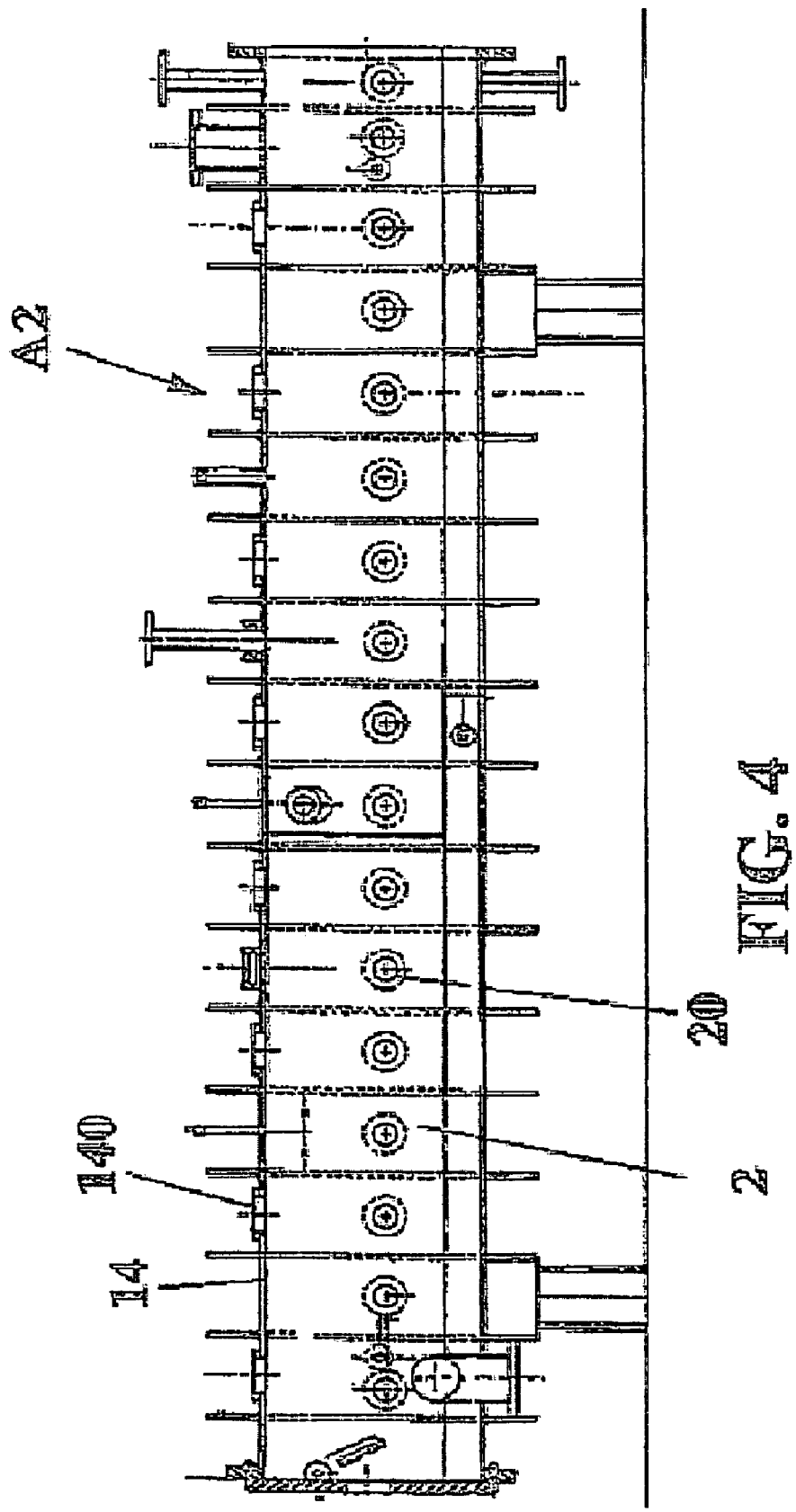
FIG. 4 is a side view of the second heating stage of the conditioning unit of FIG. 1.
Figure 5:
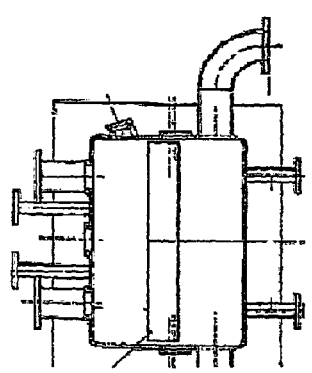
FIG. 5 is a cross sectional view of the second stage of the conditioning tunnel according to FIG. 4.
Figure 6:
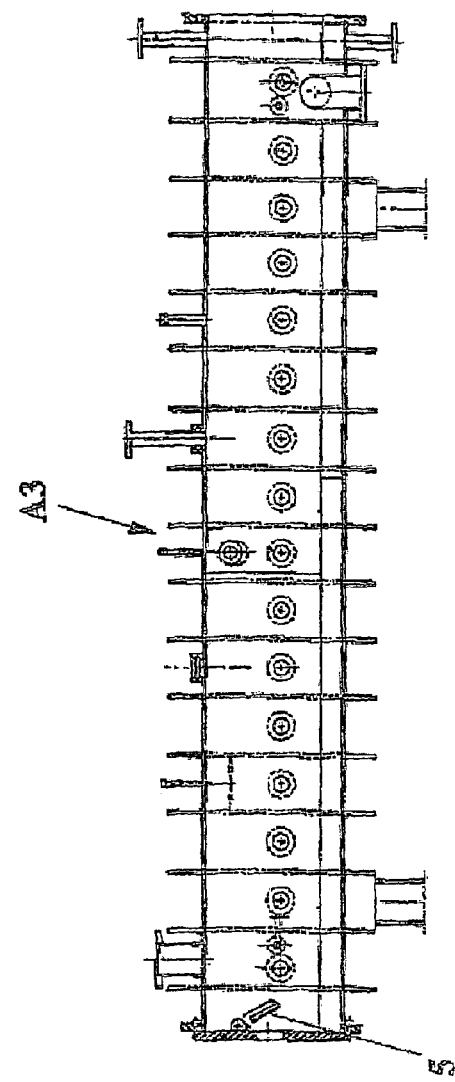
FIG. 6 is a side view of the third stage, corresponding to stabilization or temperature holding in the conditioning tunnel according to FIG. 1.
Figure 8:
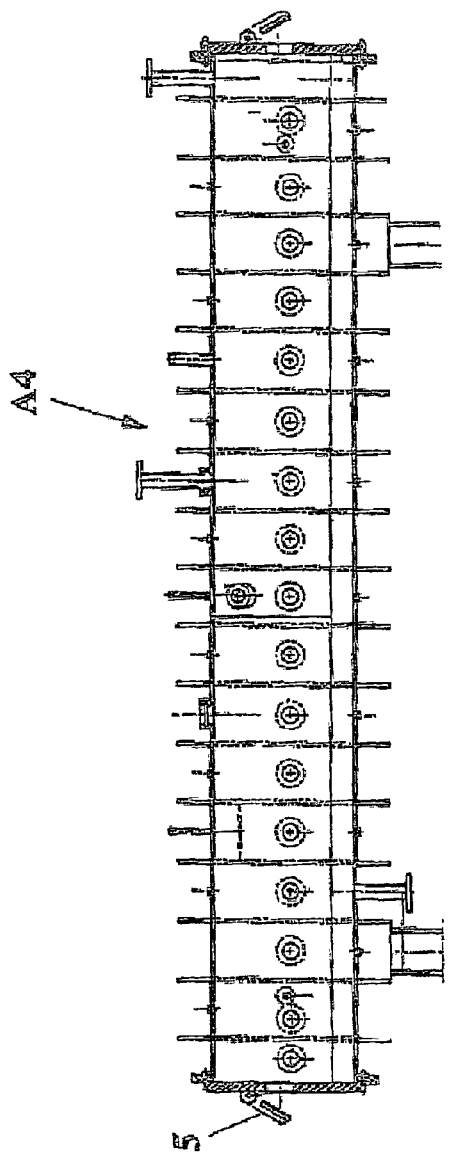
FIG. 8 is a side view of the fourth stage, where the cooling phase develops in the conditioning tunnel according to FIG. 1.
Figure 9:
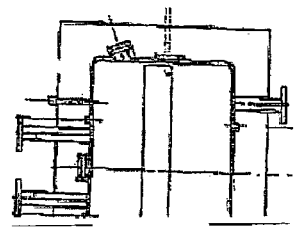
FIG. 9 is a cross sectional view of the fourth stage of the conditioning tunnel according to FIG. 1.
Figure 7:
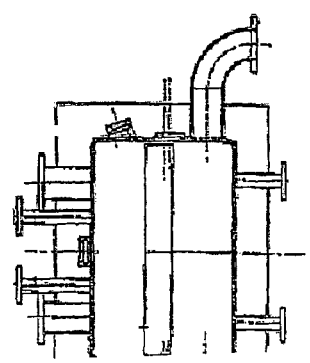
FIG. 7 is a cross section of the fourth stage in the conditioning tunnel according to FIG. 1.
Figure 10:
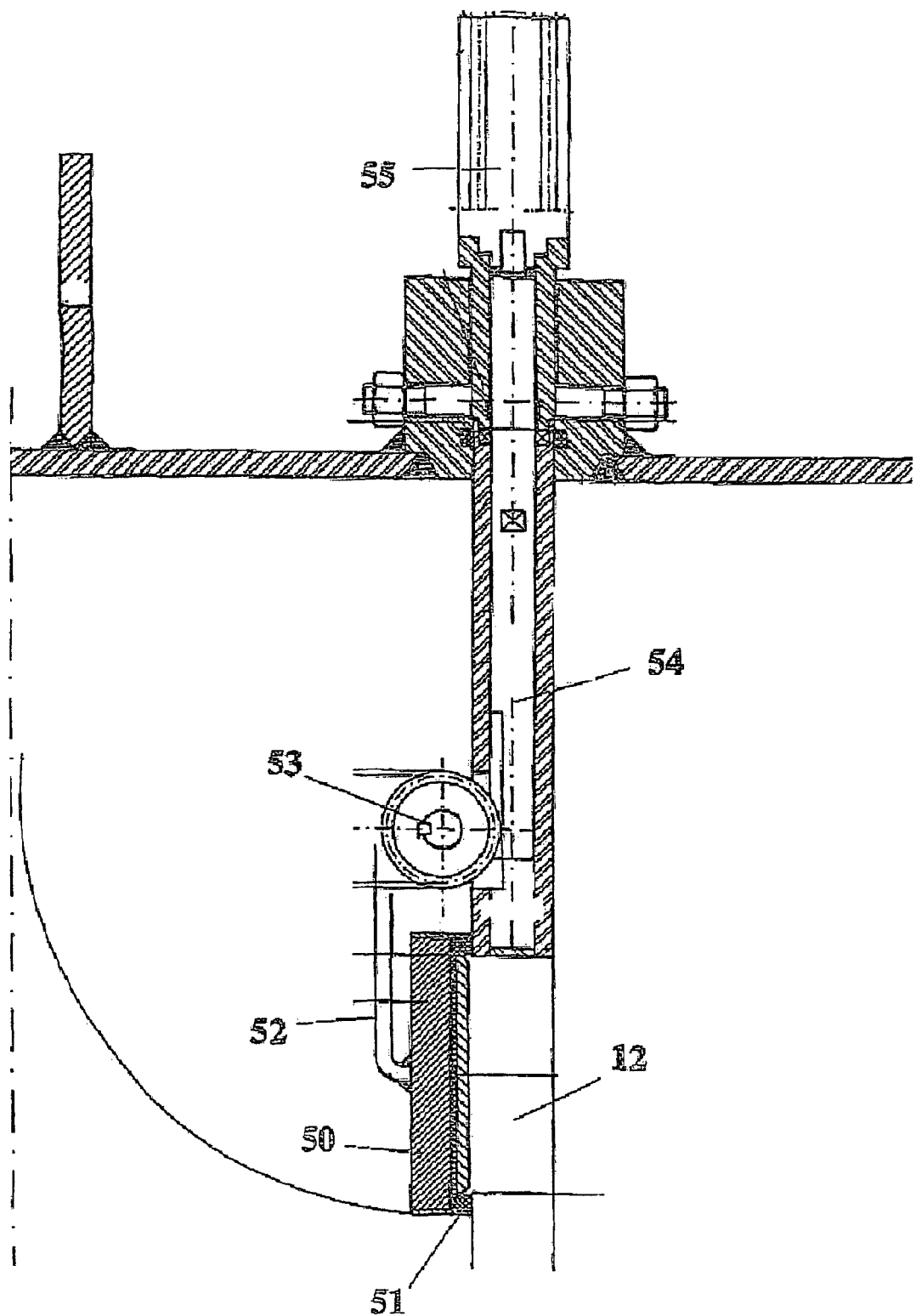
FIG. 10 is a cross-sectional view of the zone affected by the check valve, which connects two adjacent stages in the conditioning tunnel according to FIG. 1.
Figure 11:
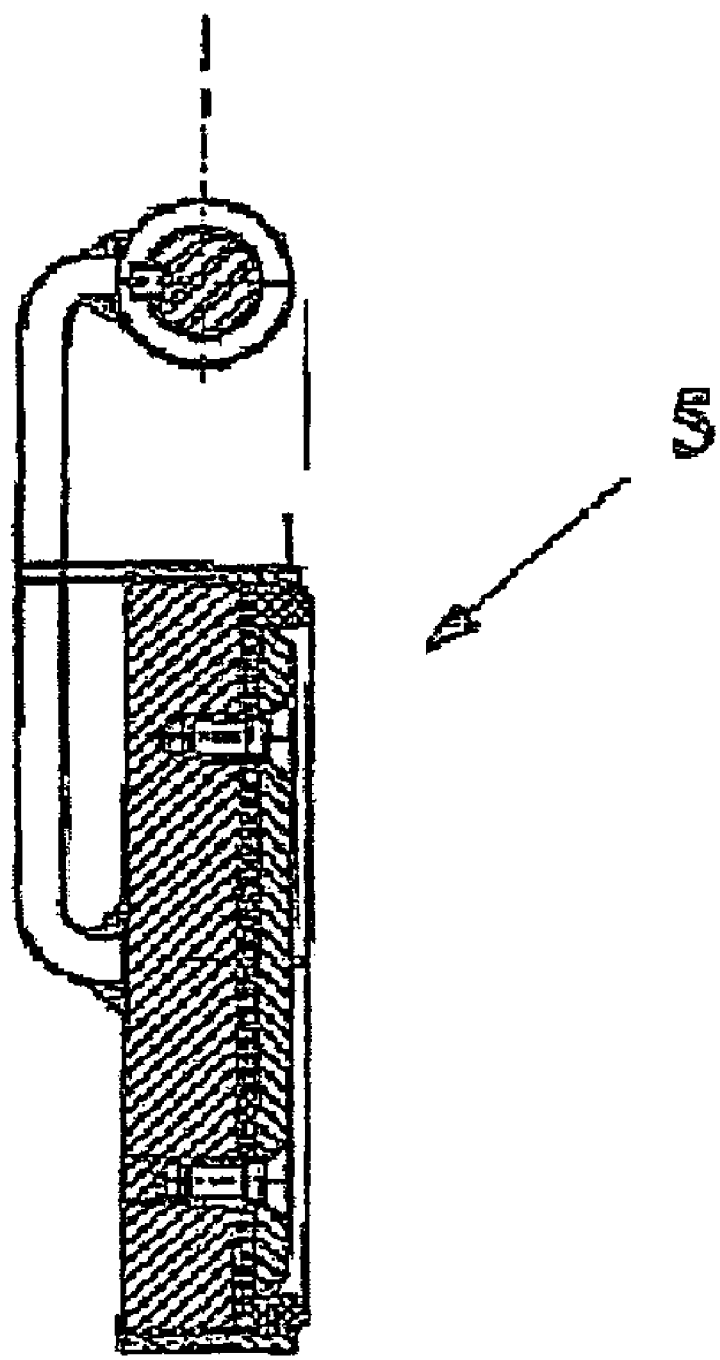
FIG. 11 is a cross-sectional vies of a single check valve door.

Each stage A1, A2, A3 and A4 is separated from the adjacent one by means of a check valve 5. The check valve 5 essentially comprises an almost flat gate 50 with dimensions slightly greater than opening 12, made in the corresponding dividing wall that separates heating stage A1, A2, A3 and A4 from the adjacent one. On the perimeter from the occluded side, the gate 50 is provided with a fitting 1 that is mounted around opening 12, so as to guarantee effective sealing. On the other side, the gate 50 has a support bracket 52 that is linked on the top to a gear 53 engaged by a rack 54 that is moved along the vertical axis by a cylinder 55. In this case, the movement of the rack 54 is functional only to permit raising of the oscillating gate 50, whereas to carryout closure, the difference in pressure existing between the two connected stages A1 and A2, A2 and A3, A3 and A4 will cause the gate to be released and fall freely to block opening 12. In this case, it is therefore comprehensible how the pressure generated downline along conditioning tunnel A, affected by stages A1, A2, A3, will always be greater than that generated in the upline stage. With addition of the cooling stage A4 of the packaged dishes 1, where a pressure essentially less than that present in the stage immediately upline A3, the provision of a stabilization stage A3 with two valves 5 is required (see FIG. 1), which open and close in opposite directions to each other. In different fashion, the valves 5 present in stages A1 and A2 have a single direction of opening, which is essentially facing downline.

Preferably, the conditioning tunnel of the present invention includes one or more temperature sensors for sensing the temperature of the products transported through stages A1-4. The temperature sensors may be any type as can be determined by those skilled in the art. For example, traditional temperature sensors positioned adjacent to the path of the food products may be employed. However, infrared thermal cameras or sensors which measure, or pictorially display, the temperature of all containers within a stage are believed preferable. Also, preferably the infrared thermometers operate at a wavelength of approximately 1.8 μm and communicate sensor data using fiber optics to reduce the disruption generated by the substantial electromagnetic field within the chambers 11. Typically, the measured temperature is the surface temperature of the container storing the food product. However, the exterior temperature of the container provides an accurate estimate for the temperature of the product within the container.

Preferably, during the transportation of the containers 1 through the tunnel, the temperature sensors continuously read the temperature of the containers, carrying out ten measurements on each container. The tunnel of the present invention produces a profile of each container and compares the profile parameters to reference values to ensure that each product is properly conditioned. As explained in greater detail below, if a product is determined to have been heated insufficiently, or too greatly, the system alters the heating parameters to properly condition the food products.

To permit heating of the packaged dishes 1, at least in stage A1, A2, and corresponding to the lower side 13 or the upper side 14, openings 130, 140 are provided, within which microwave generators are housed, like magnetrons. Each magnetron, in the present case, is covered with a non-stick protective sheath, constructed of Teflon or similar material. Owing to the particular conformation of the cross section of each stage A1, A2, A3, it is possible to provide many magnetrons, distributed in aligned rows within each stage. In a preferred embodiment, the first two stages A1 and A2 include three rows of eight magnetrons for a total of 24 magnetrons in each chamber. Preferably, stages A3 and A4 do not include magnetrons.

In a preferred embodiment of the invention, the magnetrons are cooled by water and generate 2000 W at a frequency of about 2,450 Mhz. Preferably the magnetrons produce magnetic field impulsively, in a non-constant manner, to avoid burning of products on the edges. A protective shield covers the magnetrons to protect against liquids and other bits of product. The shield, made of Teflon or similar substance, may create small reduction of the microwave field. However, such reductions are considered insubstantial. In a preferred embodiment of the invention, the magnetrons are controllable to produce electromagnetic fields that can controlled in both intensity and movement. If a product is determined to have been heated insufficiently, or too greatly, the magnetrons may be adjusted to alter the heating parameters to properly condition the food products. For example, where food products within the electromagnetic field of the magnetrons are found to have been heated less than expected, power to the magnetrons is increased to provide additional heating. Conversely, where the food products are determined to have been heated greater than expected, the power to the magnetrons is decreased to reduce heating to the food products.

Alternatively, the conditioning tunnel of the present invention may include magnetrons that produce an electromagnetic field which can be moved longitudinally or laterally with respect to the axis of the tunnel. To this end, the magnetrons may be connected to gimbals, tracks or other mechanical apparatus for physically moving the magnetrons relative to the tunnel to produce electromagnetic fields that can be controllably moved or rotated to alter the electromagnetic fields encountered by individual food products. Different mechanical apparatus for moving or rotating the magnetrons can be determined by those skilled in the art. Alternatively, the magnetrons may be constructed to passively move the electromagnetic field within conditioning tunnel, without physically moving the magnetrons. Constructions for passively moving the magnetic field can also be determined by those skilled in the art without undue experimentation.

Preferably, A2 and A3 also include inlets permitting entry of supply of hot air and aspiration 17. Air supplied at approximately 130° Celsius is believed acceptable for processing and cooking most foods. Finally, preferably stage A4 includes a cooling system including inlets, or nozzles, projecting through the stage A4 sidewalls for presentation of a cold water spray for cooling the food products. The water preferably includes an anti-freeze additive, as can be selected by those skilled in the art, for ensuring that the cooling spray is supplied at about 1° Celsius and does not freeze and clog the water inlets.

Any, or all, of the stages A1-4 may include additional cleaning fluid inlets for washing the interior of the conditioning tunnel. To this end, the stages may include nozzles projecting through the stages' sidewall which are connected to a supply of cleaning fluid to permit washing of the interior of the stages. To this end, water inlets 15 and corresponding discharges 16 are provided, positioned along each stage.

Preferably, the conditioning tunnel is fully automated, including one or more control processors for controlling the chambers' pressure, conveyor, check valve doors, magnetrons and cooling system. The control processor is also preferably connected to the temperature sensors so that temperature measurements can be used by the control processor for determining operation of the magnetrons and conveyor. For example, preferably the conveyor is adjustable to move products forward and rearward within the conditioning tunnel. Based upon temperature measurements, the control processor causes the conveyor to move products forward or rearward into, or out from, respective magnetic fields generated by the magnetrons to provide even and thorough heating of the products. Similarly, the control processor may cause the magnetrons to increase, decrease, or move the magnetic field depending on temperature measurements of the food products. For example, temperature measurments indicating that particular food products have reached desired temperatures may cause the controller to decrease the magnetic field encountered by the food product: 1) by decreasing the power to the associated magnetron; 2) by moving the food product away from the relevant magnetic field by causing the conveyor to move the food product forwardly or rearwardly, or 3) by causing the magnetic field to move relative to the food product by physically moving the relevant magnetron or causing the relevant magnetron to passively move magnetic field relative to the food product. Conversely, temperature measurements indicating that a food product has not achieved a desired temperature may cause the control processor to: 1) increase the power to the associated magnetron; 2) move the food product into the relevant magnetic field by causing the conveyor to move the food product forwardly or rearwardly, or 3) cause the relevant magnetic field to move relative to the food product by physically moving the relevant magnetron or causing the relevant magnetron to passively move magnetic field relative to the food product.

Although particular preferred embodiments of the present invention have been described herein, it is to be understood that variations may be made in the construction, materials, shape and use of the conditioning tunnel system without departing from the spirit and scope of the invention.

Having identified the presently preferred best modes of practicing the invention, we claim:

1. A conditioning system for sterilizing products within sealed packages comprising:
   a product conditioning unit including of a tunnel having two pairs of parallel sidewalls, and an entrance and an exit to form a conduit having a substantially quadrilateral cross-section, said tunnel subdivided into one or more consecutively aligned stages;
   a plurality of pressure sealing doors to seal at least one stage to form a gaseous tight sealed pressurizeable stage;
   a pressurizing means for controlling the pressure of said pressurizeable stage and for increasing the pressure within said pressurizeable stage to a sufficient level to prevent sealed packages from bursting upon application of heat;
   a conveyor means for advancing products from up line to downline through said conditioning unit; and
   a heating means for providing heating in at least said pressurizeable stage of the conditioning unit, said heating means including first and second sets of microwave sources for creating a microwave field for heating products wherein said first set of microwave sources includes one or more microwave sources which emit microwaves at a right angle to the axis of advance of products advancing through said tunnel and said second set of microwave sources includes one or more microwave sources which emit microwaves at a right angle to the axis of advance of products advancing through said tunnel, said first set of microwave sources directly connected to a first sidewall and said second set of microwave sources directly connected to a second opposing sidewall so that microwave energy emanates from said first microwave sources from a first side of said products and microwave energy emanates from said second microwave sources from an opposite side of said products.

2. The conditioning system for sterilizing products of claim 1 wherein said tunnel comprises a plurality of stages and each of said stages has opposing parallel top and bottom walls and opposing parallel sidewalls so that said tunnel has a substantially rectangular cross section.

3. The conditioning system for sterilizing products of claim 2 wherein said tunnel includes at least four stages including a preheating stage, a heating stage, a holding stage and a cooling stage.

4. A conditioning system for sterilizing products comprising:
   a product conditioning unit including of a tunnel having one or more sidewalls, an entrance and an exit, said tunnel subdivided into one or more consecutively aligned stages;
   a plurality of pressure sealing doors to seal at least one stage to form a pressurizeable stage;
   a pressurizing means for controlling the pressure of said pressurizeable stage;
   a heating means for providing heating in at least said pressurizeable stage of the conditioning unit, said heating means including a series of microwave sources for creating a microwave field for heating products;
   a conveyor means for transporting products from up line to downline through said conditioning unit;
   a temperature sensor for measuring the temperature of products traveling through said tunnel; and
   a controller connected to said heating means and said temperature sensor; said controller controlling said microwave sources to automatically move said microwave field within said stage depending on temperature measurements of the products within the tunnel.

5. The conditioning system for sterilizing products of claim 4 wherein said microwave sources produce a controllably moveable microwave field and said controller controlling said microwave sources to move said microwave field within said stage depending on temperature measurements of the products within the tunnel.

6. The conditioning system for sterilizing products of claim 5 wherein said tunnel includes at least four stages including a preheating stage, a heating stage, a holding stage and a cooling stage.

7. The conditioning system for sterilizing products of claim 5 wherein each of said stages has opposing parallel top and bottom walls and opposing parallel sidewalls so that said tunnel has a substantially rectangular cross section.

8. The conditioning system for sterilizing products of claim 4 wherein said conveyor means moves said products up line to downline or downline to up line through said tunnel and said conveyor means is connected to said controller, said controller controlling said conveyor means to move products up line or downline depending on temperature measurements of the products within the tunnel.

9. The conditioning system for sterilizing products of claim 4 wherein each stage includes an inlet for introducing cleaning liquid from the exterior of said tunnel into the interior of said stage and an outlet allowing cleaning liquid to drain from said stage.

* * * * *